United States Patent
Brown

[11] Patent Number: 5,998,961
[45] Date of Patent: Dec. 7, 1999

[54] PORTABLE BATTERY CHARGER

[76] Inventor: Audley Brown, 767 Northwest 64th St., Miami, Fla. 33150

[21] Appl. No.: 09/244,387

[22] Filed: Feb. 4, 1999

[51] Int. Cl.[6] .................................. H02P 9/01; H02J 7/14
[52] U.S. Cl. ............................ 320/105; 60/721; 290/1 A; D13/107
[58] Field of Search ............................. 320/105; 60/721; 290/1 A; D13/107

[56] References Cited

U.S. PATENT DOCUMENTS

| | | | |
|---|---|---|---|
| D. 309,892 | 8/1990 | Troup | D13/107 |
| 4,595,841 | 6/1986 | Yaguchi | 290/1 A |
| 4,902,955 | 2/1990 | Manis et al. | 320/105 |
| 5,162,662 | 11/1992 | Nakayama | 290/1 A |
| 5,212,952 | 5/1993 | Yokoyama et al. | 60/721 |
| 5,444,592 | 8/1995 | Shimizu et al. | 361/21 |

*Primary Examiner*—Edward H. Tso
*Assistant Examiner*—Gregory J. Toatley, Jr.

[57] ABSTRACT

A new portable battery charger for jump-starting an engine of a disabled vehicle. The inventive device includes a main housing having a motor and a generator disposed therein. The main housing includes gasoline and oil intake portions in communication with the motor. A pair of cables extend outwardly from one of the side walls of the main housing. The pair of cables are in communication with the generator. The pair of cables each have a spring-loaded clip disposed on free ends thereof for operative coupling with positive and negative terminals of a battery.

11 Claims, 2 Drawing Sheets

PORTABLE BATTERY CHARGER

BACKGROUND OF THE INVENTION

1. Field of the Invention

The present invention relates to battery chargers and more particularly pertains to a new portable battery charger for jump-starting an engine of a disabled vehicle.

2. Description of the Prior Art

The use of battery chargers is known in the prior art. More specifically, battery chargers heretofore devised and utilized are known to consist basically of familiar, expected and obvious structural configurations, notwithstanding the myriad of designs encompassed by the crowded prior art which have been developed for the fulfillment of countless objectives and requirements.

Known prior art battery chargers include U.S. Pat. No. 5,212,952 to Yokoyama et al.; U.S. Pat. No. 5,162,662 to Nakayama; U.S. Pat. No. 4,595,841 to Yaguchi; U.S. Pat. No. Des. 309,892 to Troup; U.S. Pat. No. 4,902,955 to Manis et al.; and U.S. Pat. No. 5,444,592 to Shimizu et al.

While these devices fulfill their respective, particular objectives and requirements, the aforementioned patents do not disclose a new portable battery charger. The inventive device includes a main housing having a motor and a generator disposed therein. The main housing includes gasoline and oil intake portions in communication with the motor. A pair of cables extend outwardly from one of the side walls of the main housing. The pair of cables are in communication with the generator. The pair of cables each have a spring-loaded clip disposed on free ends thereof for operative coupling with positive and negative terminals of a battery.

In these respects, the portable battery charger according to the present invention substantially departs from the conventional concepts and designs of the prior art, and in so doing provides an apparatus primarily developed for the purpose of jump-starting an engine of a disabled vehicle.

SUMMARY OF THE INVENTION

In view of the foregoing disadvantages inherent in the known types of battery chargers now present in the prior art, the present invention provides a new portable battery charger construction wherein the same can be utilized for jump-starting an engine of a disabled vehicle.

The general purpose of the present invention, which will be described subsequently in greater detail, is to provide a new portable battery charger apparatus and method which has many of the advantages of the battery chargers mentioned heretofore and many novel features that result in a new portable battery charger which is not anticipated, rendered obvious, suggested, or even implied by any of the prior art battery chargers, either alone or in any combination thereof.

To attain this, the present invention generally comprises a main housing having a motor and a generator disposed therein. The main housing includes gasoline and oil intake portions in communication with the motor. The motor has an exhaust tube extending outwardly of a back end of the main housing. The main housing has a removable air intake door. The air intake door allows access to an air filter and an oil filter. The main housing has a pair of hangers disposed on opposing side walls thereof. The main housing has a carrying handle disposed on an upper wall thereof. The main housing has a power switch in communication with the motor. The main housing has a series of gauges on a front face thereof. A pair of cables extend outwardly from one of the side walls of the main housing. The pair of cables are in communication with the generator. The pair of cables each have a spring-loaded clip disposed on free ends thereof for operative coupling with positive and negative terminals of a battery. The pair of cables wrap around the pair of hangers in a non-operative orientation. A pair of headlights extend outwardly from the front face of the main housing. The headlights are in communication with the generator. The pair of headlights have a power switch disposed within one of the side walls of the main housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new portable battery charger apparatus and method which has many of the advantages of the battery chargers mentioned heretofore and many novel features that result in a new portable battery charger which is not anticipated, rendered obvious, suggested, or even implied by any of the prior art battery chargers, either alone or in combination thereof.

It is another object of the present invention to provide a new portable battery charger which may be easily and efficiently manufactured and marketed.

It is a further object of the present invention to provide a new portable battery charger which is of a durable and reliable construction.

An even further object of the present invention is to provide a new portable battery charger which is susceptible of a low cost of manufacture with regard to both materials and labor, and which accordingly is then susceptible of low prices of sale to the consuming public, thereby making such portable battery charger economically available to the buying public.

Still yet another object of the present invention is to provide a new portable battery charger which provides in the apparatuses and methods of the prior art some of the advantages thereof, while simultaneously overcoming some of the disadvantages normally associated therewith.

Still another object of the present invention is to provide a new portable battery charger for jump-starting an engine of a disabled vehicle.

Yet another object of the present invention is to provide a new portable battery charger which includes a main housing having a motor and a generator disposed therein. The main housing includes gasoline and oil intake portions in communication with the motor. A pair of cables extend outwardly from one of the side walls of the main housing. The pair of cables are in communication with the generator. The pair of cables each have a spring-loaded clip disposed on free ends thereof for operative coupling with positive and negative terminals of a battery.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
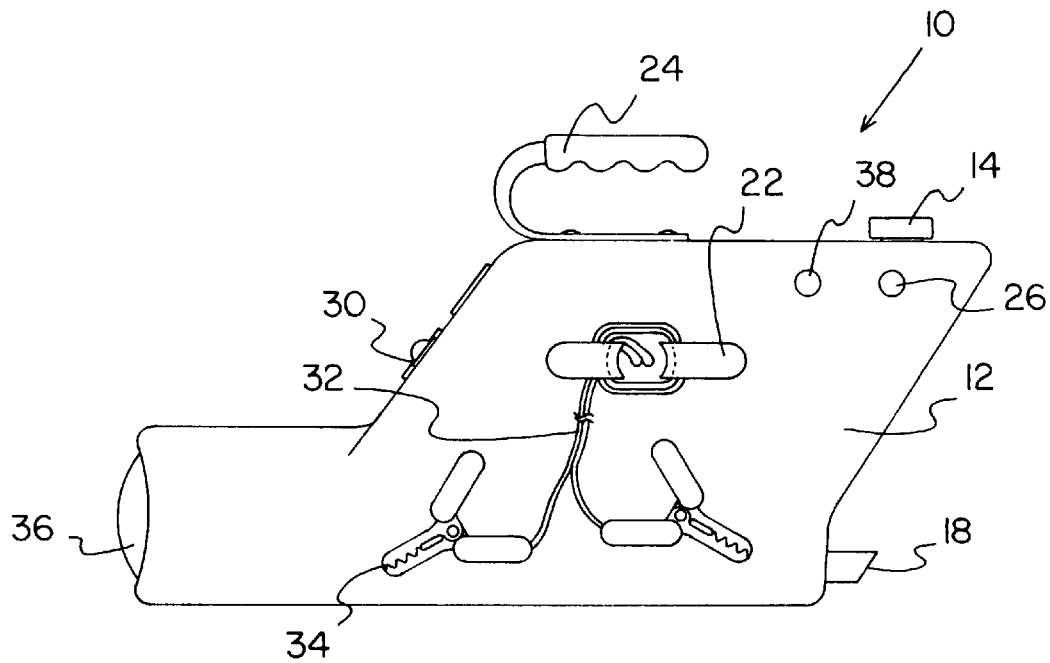
FIG. 1 is a side view of a new portable battery charger according to the present invention.
Figure 2:
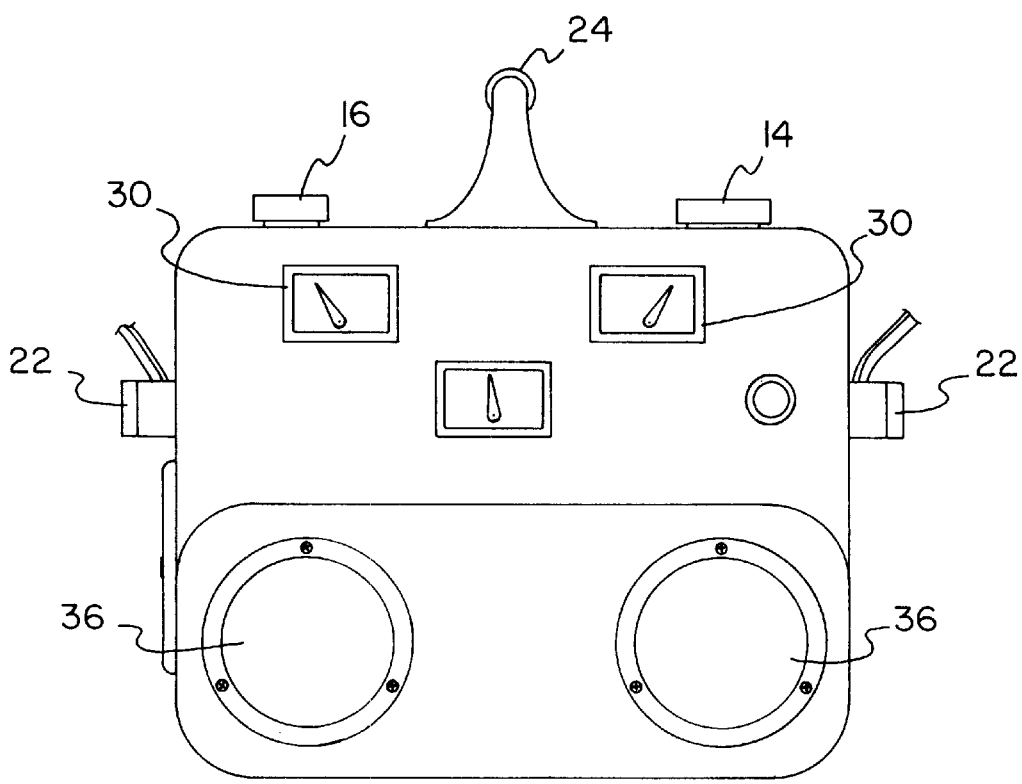
FIG. 2 is a front view of the present invention.
Figure 3:
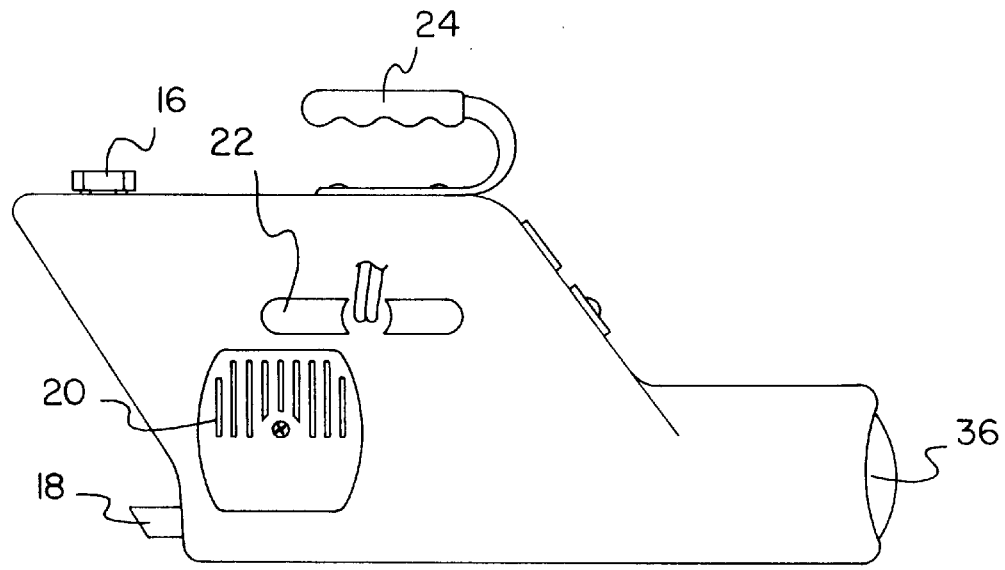
FIG. 3 is an opposite side view of the present invention.
Figure 4:
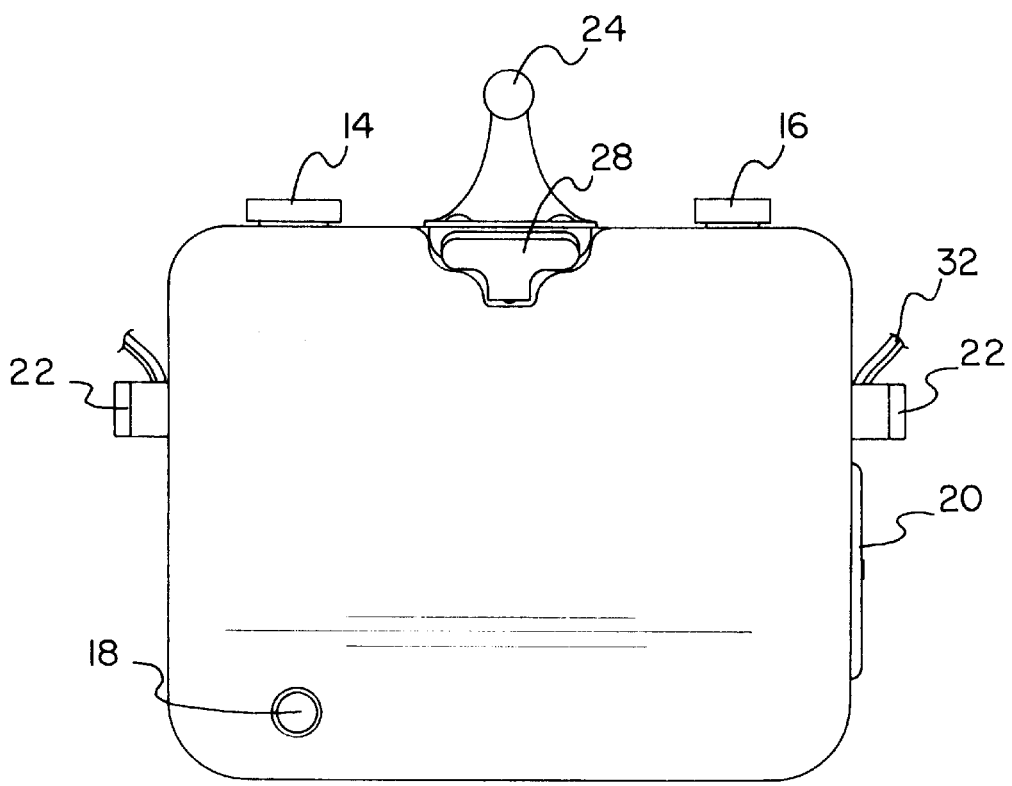
FIG. 4 is a rear view of the present invention.

With reference now to the drawings, and in particular to FIGS. 1 through 4 thereof, a new portable battery charger embodying the principles and concepts of the present invention and generally designated by the reference numeral 10 will be described.

As best illustrated in FIGS. 1 through 4, the portable battery charger 10 comprises a main housing 12 having a motor and a generator disposed therein. The main housing 12 includes gasoline and oil intake portions 14,16 in communication with the motor. The motor has an exhaust tube 18 extending outwardly of a back end of the main housing 12. The main housing 12 has a removable air intake door 20. The air intake door 20 allows access to an air filter and an oil filter. The main housing 12 has a pair of hangers 22 disposed on opposing side walls thereof. The main housing 12 has a carrying handle 24 disposed on an upper wall thereof. The main housing 12 has a power switch 26 in communication with the motor. In an alternate embodiment, the power switch 26 would be replaced by a manual rip cord 28. Note FIG. 4. The main housing 12 has a series of gauges 30 on a front face thereof.

A pair of cables 32 extend outwardly from one of the side walls of the main housing 12. The pair of cables 32 are in communication with the generator. The pair of cables 32 each have a spring-loaded clip 34 disposed on free ends thereof for operative coupling with positive and negative terminals of a battery. The pair of cables 32 wrap around the pair of hangers 22 in a non-operative orientation.

A pair of headlights 36 extend outwardly from the front face of the main housing 12. The headlights 36 are in communication with the generator. The pair of headlights 36 have a power switch 38 disposed within one of the side walls of the main housing 12.

In use, the present invention would eliminate the need to remove a dead or weak battery to have it recharged or tracking down someone for a jump-start. There would be no need to call a service station for assistance since the recharging could be completed right on the spot by the vehicle owner. By simply connecting the cables 32 and starting the motor, electricity would be produced by the alternator for direct transfer to the dead battery for recharging.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A new portable battery charger for jump-starting an engine of a disabled vehicle comprising, in combination:

a main housing having a motor and a generator disposed therein, the main housing including gasoline and oil intake portions in communication with the motor, the motor having an exhaust tube extending outwardly of a back end of the main housing, the main housing having a removable air intake door, the air intake door allowing access to an air filter and an oil filter, the main housing having a pair of hangers disposed on opposing side walls thereof, the main housing having a carrying handle disposed on an upper wall thereof, the main housing having a power switch in communication with the motor, the main housing having a series of gauges on a front face thereof;

a pair of cables extending outwardly from one of the side walls of the main housing, the pair of cables being in communication with the generator, the pair of cables each having a spring-loaded clip disposed on free ends thereof for operative coupling with positive and negative terminals of a battery, the pair of cables wrapping around the pair of hangers in a non-operative orientation;

a pair of headlights extending outwardly from the front face of the main housing, the headlights being in communication with the generator, the pair of headlights having a power switch disposed within one of the side walls of the main housing.

2. A new portable battery charger for jump-starting an engine of a disabled vehicle comprising, in combination:

a main housing having a motor and a generator disposed therein, the main housing including gasoline and oil intake portions in communication with the motor;

a pair of cables extending outwardly from one of the side walls of the main housing, the pair of cables being in communication with the generator, the pair of cables each having a spring-loaded clip disposed on free ends thereof for operative coupling with positive and negative terminals of a battery.

3. The portable battery charger as set forth in claim 2 wherein the motor has an exhaust tube extending outwardly of a back end of the main housing.

4. The portable battery charger as set forth in claim 2 wherein the main housing has a removable air intake door, the air intake door allowing access to an air filter and an oil filter.

5. The portable battery charger as set forth in claim 2 wherein the main housing has a pair of hangers disposed on opposing side walls thereof.

6. The portable battery charger as set forth in claim 2 wherein the main housing has a carrying handle disposed on an upper wall thereof.

7. The portable battery charger as set forth in claim 2 wherein the main housing has a power activation means in communication with the motor.

8. The portable battery charger as set forth in claim 7 wherein the power activation means is a power switch.

9. The portable battery charger as set forth in claim 7 wherein the power activation means is a rip cord.

10. The portable battery charger as set forth in claim 2 wherein the main housing has a series of gauges on a front face thereof.

11. The portable battery charger as set forth in claim 2 and further including a pair of headlights extending outwardly from the front face of the main housing, the headlights being in communication with the generator, the pair of headlights having a power switch disposed within one of the side walls of the main housing.

\* \* \* \* \*